United States Patent Office 3,135,726

Patented June 2, 1964

3,135,726

ACTIVATION OF HYDROCARBON CONVERSION CATALYSTS

Salvatore A. Casale, Morris Township, Morris County, and George G. Joris, Madison, N.J., assignors to Allied Chemical Corporation, New York, N.Y., a corporation of New York No Drawing. Filed Mar. 27, 1959, Ser. No. 802,278
2 Claims. (Cl. 260—94.9)

This invention relates to process of activating hydrocarbon conversion catalysts.

More particularly it relates to activation of an inorganic solid sorbent useful as an alkylation-polymerization catalyst per se, and/or activation of a support of such catalyst, which sorbent is of the type having strong sorbent power and retentivity for water, alcohols and polar liquids in general. Such sorbents are poisoned, i.e. rendered inactive, by water and polar liquids soluble in water for many of the hydrocarbon conversion reactions for which they are useful when thoroughly freed of such polar liquids. Typical of the subject sorbents are silica base sorbents such as silica gels, silica aerosols, synthetic silica/alumina gels, acid-activated clays, etc.; sorbents based upon amphoteric metal oxides such as alumina and titania gels and colloidal particles; phosphate gels such as magnesium phosphate, calcium acid phosphate and aluminum phosphate; and miscellaneous gels and colloidal particles of e.g. iron oxide, tin oxide, etc.

The polymerization reactions in which the subject sorbents are useful for catalyst purposes are particularly olefin polymerizations of the type of ethylene and propylene polymerizations to solid polymers. The alkylation reactions in which these sorbents find catalyst application are especially those wherein a low molecular weight olefin such as ethylene, propylene, butene, etc., is substituted for a nuclear hydrogen of an aromatic hydrocarbon such as benzene and substituted benzenes, naphthalene and substituted naphthalenes, etc.

The subject sorbents are known to retain tenaciously water and water-soluble liquids at temperatures such as 150° C., retaining water for example in amounts of several percent by weight. These retained liquids are known to render the sorbents practically inactive as catalysts or catalyst supports for polymerization and alkylation reactions. Accordingly it has been considered necessary as a step in activating these sorbents for use in the subject reactions to heat the sorbent to at least 175° C., generally to 400° C. and above, for at least about 3 hours to drive off retained poisoning liquids. Such heating frequently has the effect of lowering the surface area of the sorbent whereby the sorbent becomes correspondingly less effective catalytically. Moreover such heating operations generally require a special chamber in which to carry them out and consequently require transfer of the cooled sorbent, rigidly protected from contamination, from the activating chamber to the reaction vessel. Our process avoids the above difficulties and inconveniences.

Since the subject sorbents are useful in catalysts for hydrocarbon conversion reactions, it follows that in general these sorbents are not poisoned by hydrocarbons and like non-polar, water-insoluble liquids. We have discovered that when sorbed poisoning liquids, e.g. water, alcohols, etc. are evaporated from the subject sorbents by boiling the sorbent with a water-insoluble treating liquid of suitable boiling point defined below, the sorbent is thereby activated at temperatures much lower than previously considered essential. Moreover the sorbent can be maintained immersed in the treating liquid during and after activation whereby the sorbent is protected from contamination. The treating liquid used can in many instances be used directly in the subsequent polymerization or alkylation reaction as a reaction medium or a reactant. If not, the relatively low atmospheric pressure boiling point of the treating liquid, between about 65° C. and about 155° C., together with its non-poisoning character will mean that the treating liquid can easily be removed from the sorbent.

We do not fully understand all the principles involved in the success of our process; one important factor may be that as sorbed poisoning liquid is removed from the more accessible surfaces within a gel or within an aggregate of colloidal particles, the hot treating liquid may penetrate into the pores and interstices of the structure. If then the region of highest vapor pressure is at the interface of the treating liquid and poisoning liquid, within a capillary space, rather than being at the mouth of the capillary space as when simple heating with or without a gas sweep is relied on to remove the sorbed poisoning liquid, the rapidity and completeness of evaporating the poisons from within the capillary space in our process can perhaps be in part accounted for. Another factor may be that a part of the content of poisoning liquid in the capillary spaces may be removed by solution and/or emulsification in the treating liquid. A third factor may be that heated liquid carries heat into the interior of the gel and/or aggregate structures more efficiently than it can be transferred by conduction.

In order that the treating liquid can serve to vaporize poisoning liquid from the recesses of the sorbent before being boiled away, the boiling point of the treating liquid should be higher than the boiling point of its mixtures with the poisoning liquid; thereby the poisoning liquid will be boiled out preferentially. This means that either the treating liquid and the poisoning liquid should form a low boiling azeotrope or if not, then the treating liquid should boil higher than the poisoning liquid.

The treating liquid chosen for use in our process can in general be any hydrocarbon which has no unsaturation other than, permissibly, aromatic unsaturation, e.g. a saturated open chain or cyclic hydrocarbon, an alkylbenzene, or benzene itself. In some instances, especially when the sorbent is to be impregnated with an active catalytic material subsequently to treatment by our process, more reactive hydrocarbons can be used, e.g. liquid hydrocarbons with internal olefinic bonds. It is also possible in some instances to use as treating liquid a hydrocarbon substituted by one or more groups such as chloro, fluoro, alkoxy, etc., which do not confer solubility in water upon the hydrocarbon substituted thereby. In some instances the treating liquid may be chosen to assist catalyst activation both by removing poisoning liquid as vapors in accordance with our process and by reacting with a component of the catalyst, for example reducing a supported VI group metal compound.

The boiling treatment in accordance with our invention is continued at least until the action of the treating liquid has vaporized poisoning liquid down to a content at which the sorbent has substantial catalytic activity as measured by its performance when used as catalyst or support in the intended polymerization or alkylation reaction. In general the treatment will last at least about one hour. Often a shorter period for our treatment can be used than is needed for activation of a like catalyst by high temperature heating; thus 2–4 hours of treatment will often suffice to obtain a level of catalyst activity by our process, which would require up to 10 hours to be obtained by prior art heat activation of the same sorbent.

Catalysts activated by our process are generally active for hydrocarbon conversion reactions, particularly for olefin polymerizations and for alkylations of hydrocarbons by olefins and especially for such of these reactions as are run at relatively low temperatures, not above about 150° C.

Poisoning liquids which are particularly effectively removed by our process include water and methanol. Among sorbents which become most active after treatment by our process are the silica base sorbents, including clays and sorbents which are substantially pure silica, apart from constituents volatile upon ignition.

The following examples describe completely specific embodiments of our invention and illustratively set forth the best mode contemplated by us of carrying out our invention. However, the invention is not to be considered as limited to all details of the examples.

*Example 1*

(A) A solution of 61 parts by weight of magnesium chloride hexahydrate in 2780 parts by weight of methanol was acidified to pH of 2.0 as measured by a conventional type of pH meter by adding thereto 19.6 parts by weight of orthophosphoric acid as 85% by weight acid in aqueous solution. Upon dropwise addition of 10.2 parts by weight of ammonia, added as 28% ammonia in aqueous solution to the gently stirred reaction mixture, partial gelation occurred. The reaction mixture was allowed to stand for 30 minutes while gel formation continued and the pH rose to 7.8. The gel was then filtered and washed 10 times with about 400 parts by weight of methanol in each washing. Thereby an alcogel was obtained containing 12% by weight of magnesium phosphate.

This alcogel was impregnated by first slurrying with a solution of magnesium dichromate in absolute methanol containing about 1% by weight of chromium based on the weight of magnesium phosphate sorbent. Then the slurry was mixed with benzene at a ratio of about 200 ml. of benzene per gram of magnesium phosphate in the slurry. Activation of the resulting catalyst was effected by boiling the slurry for about 3 hours, taking off about half the benzene as vapor together with evolved methanol and water vapors. Thereby substantially all poisoning liquid (methanol and water) was removed, leaving an active catalyst slurried in benzene.

The catalyst was used in a polymerization run as follows. To the slurry of catalyst was added a weight of aluminum triisobutyl equal to the weight of slurried catalyst. The reaction mixture was exposed to gaseous ethylene at a pressure of one atmosphere absolute while being agitated with sufficient vigor that the rate of ethylene absorption showed no further increase with increasing rate of agitation. The run was continued about 17 hours at about 30° C. Solid ethylene polymer was formed at average rate of 0.5 gram of polymer per gram of slurried catalyst per hour.

When the supported catalyst is merely oven dried, before use, at temperatures up to about 150° C. without being boiled with benzene, a preparation obtained otherwise as above lacks catalytic activity. Even when still higher drying temperatures were applied, namely 300° C. for 3 hours in dry air and then in dry nitrogen for another hour, the catalyst remained inactive, failing to produce any substantial quantity of polymer under polymerization conditions as above.

(B) Like results to those above outlined were obtained upon gelling calcium acid phosphate (at pH reaching 6), impregnating as above, and activating in boiling benzene as above, whereby a similarly active ethylene polymerization catalyst was obtained. Again, this impregnated calcium acid phosphate gel remained catalytically inactive upon drying as above at 300° C. instead of activating in boiling benzene.

*Example 2*

(A) A colloidal size pigment grade titanium dioxide, 95% in anatase crystal form and 5% in rutile form, of average particle size about 0.02–0.03 micron and surface area about 70 sq. meters per gram was impregnated with aqueous magnesium dichromate solution containing about 0.5% by weight of chromium based on the weight of the titanium dioxide sorbent. The wet catalyst was placed in a 500 ml. round bottom flask containing a magnetic stirrer together with 2,2,4-trimethylpentane in proportion of about 200 ml. of trimethylpentane per gram of catalyst (dry basis). The slurry was brought to boiling (about 100° C.) and about half of the trimethylpentane was taken off as vapor together with vaporized water.

To the remaining slurry of catalyst in trimethylpentane was added 2 parts by weight of aluminum triisobutyl per part by weight of catalyst. The whole was transferred to a shaker bomb and ethylene pressure of 400 p.s.i. was applied while the reaction mixture was heated at average temperature of about 50° C. In the course of 11.5 hours solid ethylene polymer was produced at average rate of 16.8 grams of polymer per gram of catalyst per hour.

If the colloidal titanium dioxide used above is impregnated as above with aqueous magnesium dichromate and merely oven dried, before use, at temperatures up to 150° C. practically no polymerization occurs therewith under the above reaction conditions.

(B) When normal hexane (atmospheric pressure boiling point 69° C.) was substituted for trimethylpentane in the above procedure, the resulting catalyst was about as active as the above in a like polymerization run. Solid polyethylene was produced therewith at average rate of 15.7 grams per gram of catalyst per hour.

(C) When magnesium phosphate alcogel catalyst impregnated with magnesium dichromate as in Example 1 was activated in boiling trimethylpentane as in this Example 2, it proved to be an active catalyst. By the polymerization procedure of this Example 2, using said impregnated magnesium phosphate catalyst, solid polyethylene was produced at average rate of 10.5 grams per gram of catalyst per hour.

*Example 3*

(A) A hydrated silica of bulk density 10 lbs. per cu. ft., specific gravity 1.95 (analysis 87% $SiO_2$—0.5% CaO—0.2% $Fe_2O_3$—0.6% $Al_2O_3$—1% NaCl—10% ignition loss at 1200° C.) having average particle size about 0.02 micron and having surface area of about 150 sq. meters per gram was impregnated by slurrying with an aqueous solution of magnesium dichromate containing about 1% of chromium based on the weight of the silica sorbent. The wet catalyst was slurried with benzene in a proportion of about 200 ml. of benzene per gram of slurried catalyst (dry basis) and was heated to boiling. About half the benzene was taken off as vapor together with water vapor over a period of about 3 hours, whereby the water content of the sorbent was substantially completely removed.

This catalyst polymerized ethylene by the method of Example 1 above to solid polymers at average rate of 2 grams of polymer per gram of catalyst per hour over a reaction period of 2.75 hours.

(B) A catalyst prepared by the method above, part (A), using as sorbent a dried porous silica aerogel with average particle size of about 3 microns and surface area of roughly 150 sq. meters per gram, was activated in boiling benzene as above. This catalyst polymerized ethylene by the method of Example 1 to solid polymers at average rate of 1.4 grams of polymer per gram of catalyst per hour over a reaction period of 3.25 hours.

A catalyst prepared as in this Example 3, part (A) or (B) but merely oven dried, before use, at temperatures up to about 150° C. lacks activity. Practically no polymerization occurs therewith under the polymerization conditions used in this Example 3.

*Example 4*

An acid-activated, non-swellable bentonite type clay catalyst having a base exchange capacity of 100 was activated in refluxing benzene in a Dean and Stark apparatus, until no more water collected in the water trap. The acid-activated clay catalyst amounted to 14.2% by weight of the benzene.

The slurry of catalyst in benzene was exposed to propylene while being heated to temperatures which rose from about 79° C. at the beginning of the reaction period to about 90° C. at the end of the reaction period. Propylene was absorbed in a ratio of about one mol of propylene per 4 mols of benzene. Upon fractionating the reaction mixture after a reaction period of about 4 hours and 20 minutes the reaction products were found to contain 34 weight percent of isopropyl benzene and 4.2 weight percent of polyisopropylene benzenes with the balance being unreacted benzene.

Substantially no alkylation occurs under the above low temperature alkylation conditions in presence of a like acid-treated clay catalyst which has been merely oven dried at temperatures up to about 150° C.

The boiling treatment herein described is essentially all that is needed to produce an active catalyst. However still greater activity is obtainable in some cases, e.g. with magnesium phosphate, by an after-treatment of heating to dryness, e.g. at 300° C. in air followed by nitrogen. Our treatment in boiling liquid preceding said heating appears to stabilize the catalyst against deleterious effects noted when such heating is carried out without first treating with boiling liquid in accordance with our invention.

We claim:

1. In a process for catalytic polymerization to solid polymers of a low molecular weight olefin with at least one material of the group consisting of said olefin and olefins polymerizable therewith employing a contact mass formed by impregnating an inorganic solid sorbent of the group consisting of silica base sorbents, sorbents based upon amphoteric metal oxides, and phosphate gels with a solution of VI group metal compound in a solvent of the group consisting of water and water-soluble alcohols: the method af activating said contact mass consisting essentially of immersing the contact mass in at least one hydrocarbon of the group consisting of saturated open chain and cyclic hydrocarbons, alkyl benzenes and benzene which hydrocarbon has atmospheric pressure boiling point in the range between about 65° C. and about 155° C. and boils above the boiling point of its mixture with said solvent used for impregnation; boiling and taking off vapors of said hydrocarbon and said solvent and removing said solvent evolved as vapor during said boiling; and continuing said boiling and said taking off and removal of vapors while maintaining said contact mass immersed in a liquid phase of said hydrocarbon at least until said contact mass is activated to the point that it will polymerize ethylene at temperatures of about 30° C. and pressure of one atmosphere absolute and in presence of a weight of aluminum triisobutyl equal to the weight of said contact mass, at rate of at least 0.5 gram of polymer formation per hour per gram of contact mass; said liquid phase of hydrocarbon in which the contact mass is immersed at the end of said activation being the reaction medium for the subsequent catalytic polymerization.

2. In the process of claim 1, the method of activation defined in claim 1 wherein the solvent removed is water and the sorbent is substantially pure silica, apart from constituents volatile upon ignition.

References Cited in the file of this patent

UNITED STATES PATENTS

| | | |
|---|---|---|
| 1,794,538 | Palmer et al. | Mar. 3, 1931 |
| 2,754,344 | Weatherly | July 10, 1956 |
| 2,824,089 | Peters et al. | Feb. 18, 1958 |